United States Patent [19]
Robrock, II

[11] Patent Number: 5,680,390
[45] Date of Patent: Oct. 21, 1997

[54] BROADBAND TELECOMMUNICATIONS NETWORK AND METHOD OF HAVING OPERATIONS SYSTEMS SUPPORT

[75] Inventor: Richard Barker Robrock, II, Bedminster, N.J.

[73] Assignee: Bell Communications Research, Inc., Morristown, N.J.

[21] Appl. No.: 466,482

[22] Filed: Jun. 6, 1995

[51] Int. Cl.[6] .............................. H04J 3/14; H04L 12/26
[52] U.S. Cl. .......................... 370/229; 370/236; 370/244
[58] Field of Search ........................ 370/60, 60.1, 58.1,
370/58.2, 58.3, 16, 17, 94.1, 110.1, 68.1,
229, 230, 232, 235, 236, 242, 244, 248,
250, 252, 253; 379/229, 230, 207, 221,
220, 112, 113, 115, 114

[56] References Cited

U.S. PATENT DOCUMENTS

| | | | |
|---|---|---|---|
| 4,494,230 | 1/1985 | Turner | 370/60 |
| 4,769,833 | 9/1988 | Farleigh et al. | 379/105 |
| 5,359,600 | 10/1994 | Ueda et al. | 370/60.1 |
| 5,392,402 | 2/1995 | Robrock, II | 370/60.1 |
| 5,436,894 | 7/1995 | Wallmeier et al. | 370/60.1 |
| 5,483,525 | 1/1996 | Song et al. | 370/60 |

*Primary Examiner*—Douglas W. Olms
*Assistant Examiner*—Ajit Patel
*Attorney, Agent, or Firm*—James W. Falk; Joseph Giordano

[57] ABSTRACT

A broadband intelligent network employs a fast-packet switch having a plurality of ports and a switch processor for establishing switched or permanent virtual port connections, for routing cells through the connections to and from the ports, and for processing network operations signals. A network control system is coupled to the switch processor to receive network operations signals therefrom and to send network operations signals thereto. A network operations system is interfaced with the network control system which routes network operations signals between the switch processor and the network operations system. The operations system may be a family of operations systems which provide respective network support functions including administration, maintenance, provisioning and billing functions.

19 Claims, 11 Drawing Sheets

BROADBAND TELECOMMUNICATIONS NETWORK AND METHOD OF HAVING OPERATIONS SYSTEMS SUPPORT

The present invention relates to apparatus and operating methods for broadband intelligent networks, and more particularly to such networks in which effective and efficient operations are enabled through the integration of operations systems therewith.

In the telecommunications industry, and throughout this application, the term "operations" means planning, engineering, provisioning, operating, and maintaining the network, billing customers for services, and receiving and processing customer requests for information, service, and maintenance. Network operations are assisted by operations systems, each of which typically includes a computer-based system, programmed to execute particular operations functions on the basis of data received from various elements of the network.

The existing circuit-switched network in the United States has numerous exchange switches, each of which is interfaced to multiple operations systems that provide predetermined, basic operations system functions. The basic operations system functional components include Operations (O), Administration (A), Maintenance (M), Provisioning (P) and Billing (B).

Generally, each operations system is designed to support multiple exchange switches, and each switch is typically linked to perhaps four or five operations systems that provide different operations system functions. Larger exchange switches are typically interfaced with a greater number of operations systems.

For example, an exchange switch may be interfaced with a traffic data collection operations system for administrative purposes. The exchange switch may further be interfaced with a surveillance system for maintenance purposes, a memory administration system for operations purposes, and a billing operations system.

Each data communication link from an exchange switch to an operations system normally is a dedicated link which has an electronic controller at each end and which may be as long as twenty or more miles. Operations system interfaces in the prior art are thus very costly.

Remote switching systems have been employed in the circuit-switched network to enable operations system functions to be provided to smaller and/or more remotely located exchange switches. For example, up to ten or more remote switches may be coupled through data links to a host exchange switch which in turn is interfaced to a family of operations systems to obtain support for the host switch and the remote switches. The remote switching concept has made it economically feasible to provide operations system support in rural areas where very small exchange switches are required.

Thus, from an overall perspective, operations system support has been available in the circuit-switched network (CSN), but it has been costly and relatively cumbersome.

A new type of telecommunications network, known as a fast-packet network, allows all-digital, broadband, multimedia communication between calling and called parties. These fast-packet networks have generally operated without real-time network control and with little or no operations system support. The existing CSN operations systems are not particularly suited for use in fast-packet networks, at least without modification.

New development work on operations systems for fast-packet networks has been based on the same operations architecture that has been used in the circuit-switched network. That is, each fast-packet switch is interfaced directly with a family of operations systems. Thus, operations system development for fast-packet networks has been characterized with the disadvantages of high cost and the inefficiency previously described for the CSN.

More recently, a broadband intelligent network (BIN) has been developed as an improved network over previous fast-packet networks. In the BIN, a Service Control Point (SCP) or an Integrated Service Control Point (ISCP) is used to provide a network control function. The SCP (or ISCP) receives a signaling cell from a CPE unit requesting that a Switched Virtual Circuit (SVC) be established to a called party. The SCP responds by sending a command cell with translation data to Connection Management software in an asynchronous transfer mode (ATM) switch or other fast-packet switch, and by subsequently alerting the called party through the use of a signaling cell.

The BIN provides intelligent network control of call handling and other network services as is disclosed in greater detail in the following applications, both of which are assigned to the present assignee and are hereby incorporated by reference: Ser. No. 08/063,661, entitled "Intelligent Broadband Communication System and Method," filed by Richard B. Robrock on May 20, 1993 (now abandoned) and Ser. No. 08/069,243, entitled "Intelligent Broadband Communication System and Method," filed as a Continuation-in-Part application of Ser. No. 08/063,661 by Richard B. Robrock on May 28, 1993 and now U.S. Pat. No. 5,539,884, issued Jul. 23, 1996.

The BIN generally operates with improved functionality for fast-packet networks. It is desirable that the BIN be developed structurally so that operations systems support is provided in fast-packet networks with improved economy, efficiency, and functionality.

DISCLOSURE OF THE INVENTION

Accordingly, the present invention is directed to a BIN and a BIN operating method in which operations systems support is provided with improved functionality, better economy, and better efficiency.

Generally, these apparatus and method improvements are achieved through a centralization of operations support under the control of a network controller with umbilical transmittal of O, A, M, P and B data signals to the controller.

A broadband intelligent network comprises a fast-packet switch having a plurality of ports and a switch processor for establishing switched virtual port connections, for routing cells through the connections to and from the ports, and for processing network operations signals. A network control system is coupled to the switch processor to receive network operations signals therefrom and to send network operations signals thereto, and a family of operations systems is interfaced with the network control system.

The network control system has routing means for sending operations signals between the switch processor and the operations systems.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

BEST MODE OF THE INVENTION

The present invention is directed to a broadband intelligent network (BIN) in which a family of operations systems perform the operations functions needed for reliable, effective, efficient, and economic BIN operation. The operations systems support such functions as provisioning, traffic data collection, billing, and surveillance.

Each operations system is structured to provide predetermined operations functions and is interfaced with the BIN through a network controller or through one or more fast-packet switch ports. In the interface, communication paths are established to and from the operations systems preferably to allow a single family of operations systems to support the entire BIN.

Examples of the present preferred embodiments of the invention are illustrated in the accompanying drawings and will now be described in detail.

BROADBAND INTELLIGENT NETWORK WITH OPERATIONS SYSTEM SUPPORT

Figure 1A:
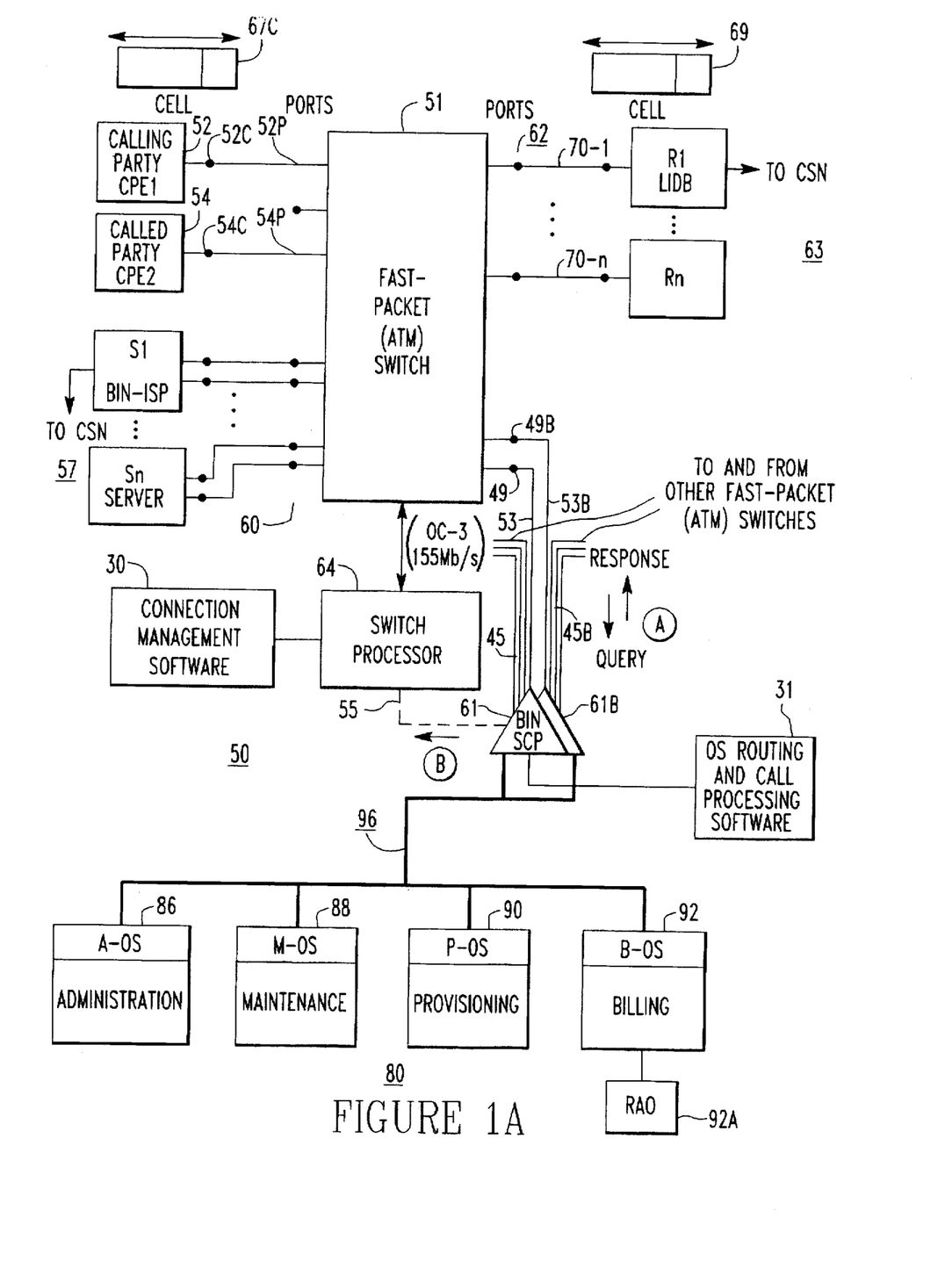
FIGS. 1A and 1B show respective network diagrams for first and second embodiments in which operations systems are integrated in a broadband intelligent network in accordance with the invention to provide improved network operation.

In FIG. 1A, a BIN 50 of the invention is structured and operated on the basis of fast-packet technology. As used herein, a fast-packet network means a network that transports digital data in packets at high transport rates (typically megabits per second) with sub-millisecond switch delays and without retransmission of errored packets.

The BIN 50 includes a fast-packet switch 51 preferably in the form of an ATM switch. The fast-packet switch 51 has a plurality of two-way ports 60 and 62, each of which may be provided with fiber optic links to subscribers.

A fiber optic link or connection herein means a connection established wholly or partly using fiber optic facilities. Each fiber optic link can provide connections for multiple subscribers. Other media such as coaxial cable or wire pairs may be employed at lower speeds where appropriate.

The BIN 50 further includes a network control system called a BIN Service Control Point (BIN-SCP) 61, and a backup BIN-SCP 61B. The ATM switch 51 has a switch processor 64 with connection management software 30 and other software.

The BIN-SCP 61 has service request or call processing software 31 and is generally structured as described in my U.S. Pat. No. 5,539,884, issued Jul. 23, 1996.

Each customer has a CPE unit that is connected directly or indirectly to an ATM fast-packet switch port. A calling party CPE 52 (CPE1) and a called party CPE 54 (CPE2) are representatively shown with respective ATM switch port connections from terminals 52C and 54C to ports 52P and 54P.

A system 63 of resource units R1 through Rn (an example of a resource unit includes a Line Information Data Base ("LIDB")) is interfaced to respective ports 62 of the ATM switch 51 either by direct connection as indicated by connection paths 70-1 through 70-n, by indirect connection through other ATM switches (not shown), or by other indirect connection through multiplexer circuitry (not shown) or other interface circuitry (not shown). Accordingly, the term "interfaced" as used herein regarding connection of a resource unit, a server unit, or an operations system to a fast-packet or ATM switch port means a "direct" connection to the port or an "indirect" connection to the port through one or more fast-packet or ATM switches and/or through multiplexer or other interface circuitry.

For more information on the operation of the LIDB in the BIN 50, reference is made to my now copending patent application Ser. No. 08/084,386, and which issued as U.S. Pat. No. 5,392,402, Feb. 21, 1995, is assigned to the present assignee and is incorporated by reference. For more information on the operation of CPE units in the BIN 50, reference is made to another copending patent application Ser. No. 08/125,978, now allowed, which is also assigned to the present assignee and is also incorporated by reference.

The BIN 50 further includes a server system 57 having a plurality of servers S1 through Sn. Each server is generally structured with service circuitry to provide a special service on request by calling parties. The servers S1 through Sn may include servers that exist in the circuit-switched network and are interfaced for operation with the BIN 50, as well as servers structured for operation only in the BIN 50.

The server S1 is an Intelligent Services Peripheral ("ISP") having service circuits which provide certain basic services such as speech synthesis, voice recognition, and voice recording and playback when requested by a calling or called party. The ISP S1 may be a server dedicated to the BIN 50 or a server that exists in the CSN and is adapted to be operational in the BIN 50. For more information on the server system 57, reference is made to the incorporated patent application Ser. No. 08/125,978.

In accordance with the present invention, the BIN 50 includes a plurality of operations systems (OSs) 80 which are interfaced with the BIN-SCPs 61 and 61B (the broadband network control system or network controller) to provide operations support for the BIN 50 with improved functionality and better economy and efficiency. An interfaced OS 80 means an OS coupled through an ATM port as previously defined, and, in addition, an OS directly or indirectly coupled to a network controller for the broadband network.

Generally, OSs may be organized in a variety of ways to provide network support needed for broadband network operations. Historically, in the CSN, each OS has been categorized according to the basic management objectives that it serves. Thus, each OS in the CSN has usually been categorized as a system that operates to provide Administration (A), Maintenance (M), Provisioning (P) or Billing (B) objectives.

More recently, network service creation functions have been provided through the use of service creation systems such as the SPACE® system, which is described in U.S. Pat. No. 5,339,884 issued on Jul. 23, 1996, which are incorporated by reference as well as the following patent applications which are also incorporated by reference: 1) Babson-Ely. U.S. Pat. No. 5,241,588 issued on Aug. 31, 1993, entitled "Systems and Processes Providing Programmable or Customized Customer Telephone Information Services;" 2) non et al U.S. Pat. No. 5,540,480 issued on Sep. 12, 1995, entitled "A Method of Creating a Telecommunication Service Specification" (now abandoned); and 3) U.S. patent application Ser. No. 07/934,240, entitled "System and Method for Creating, Transferring, and Monitoring Services in a Telecommunication System", by Nazif et al, filed Aug. 25, 1992 (now abandoned). As an operations support service, service creation and management of newly created services are Categorized in this application as a P type of OS.

In providing operations system support for the BIN 50, a family of basic OSs and the organization of OS functions may generally be embodied in various ways as previously indicated. However, in the preferred embodiment described herein as an illustration of the invention, the conventional OS organization of A, M, P and B OSs is employed as an architecture for the family of basic OSs. Each basic A, M, P or B OS may in turn be partitioned into a subfamily of OSs directed to its basic function or management objective. OSs that are included in a subfamily may be further partitioned by function, geographic area or by both function and geographic area.

Thus, the basic OSs 80 are illustrated in FIG. 1A as including the four basic OSs, 86, 88, 90 and 92, which respectively provide the conventional operations basic functions i.e., administration, maintenance, provisioning, and billing functions as OS support for the BIN 50.

Billing is implemented through the use of a billing operations system 92 located, for example, at a regional accounting office (RAO) 92A. Billing data acquired by the network controller is transmitted to the RAO for processing as more fully disclosed in my aforementioned U.S. Pat. Nos. 5,539,884 and 5,392,402, and my patent application Ser. No. 08/125,978.

OS organizations other than the organization just described may be employed in accordance with the invention. Generally, any OS may be an entirely new OS, having its design driven by considerations of the design and needs of a BIN, or any OS may essentially be a CSN OS which is adapted for interfacing with a BIN.

In the preferred SCP embodiment, all of the OSs are data-linked to the network through the network controller and the connection 53 or 55 which functions as an umbilical coupling for the OSs. The network controller thus operates principally as a data handler in the operation of the network OSs. Further, maximum use can thus be made of previously installed equipment in a telecommunications infrastructure. The OSs 80 and the BIN-SCPs 61 and 61B are appropriately interfaced to provide communication paths for two-way data flow between the BIN 50 and the OSs 80 in accordance with the invention.

Figure 1B:
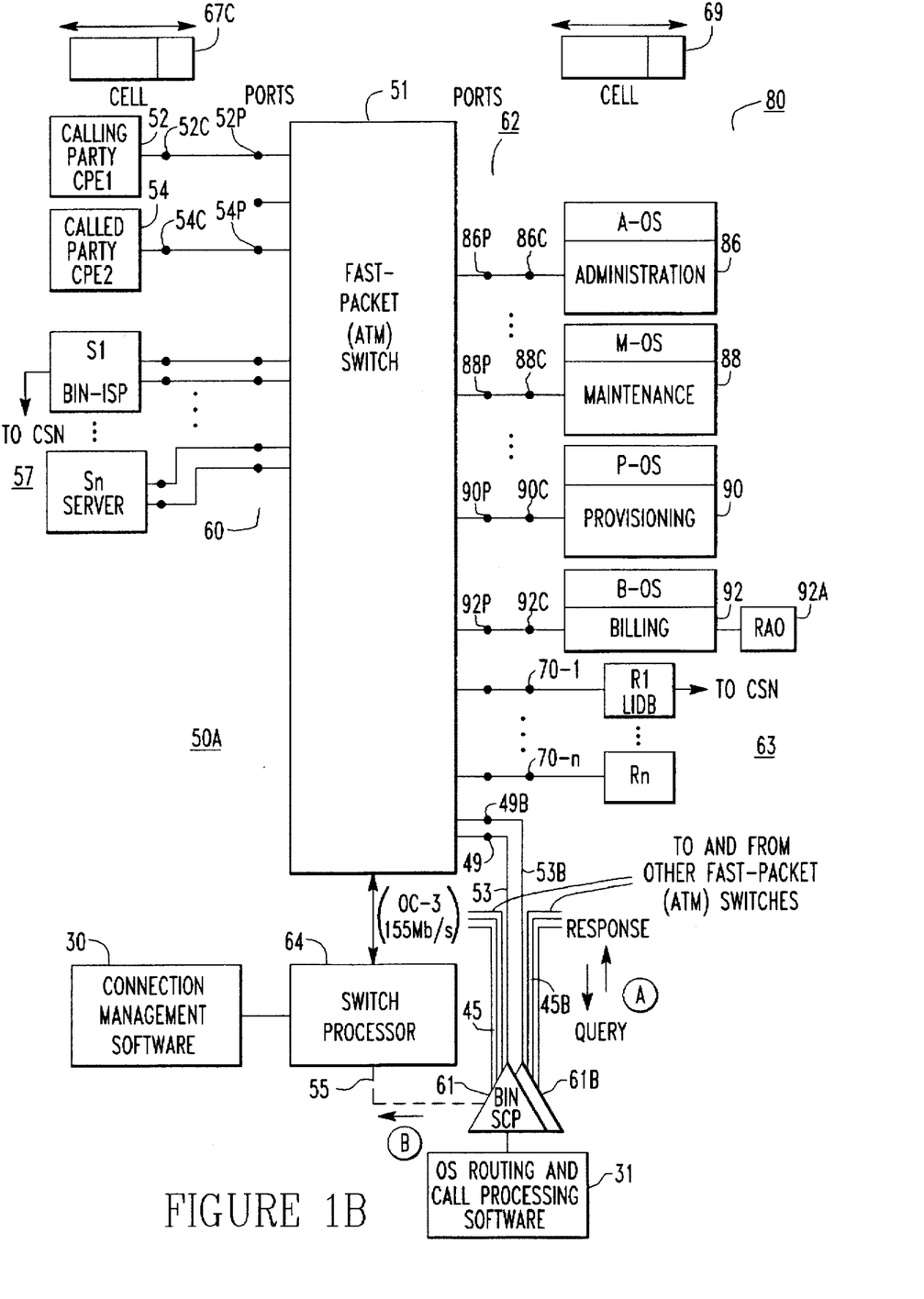

A BIN 50A is shown as another embodiment of the invention in FIG. 1B. Like reference characters are employed for like elements in the embodiments of FIGS. 1A and 1B.

Each OS is normally a computer-based system which automates some aspect(s) of network or service management. A wide variety of BIN support functions can thus be provided by OSs, as further considered subsequently herein.

In this case, the basic OSs 80, are interfaced to the fast-packet switch 51 through two-way connections from system terminals 86C through 92C to switch ports 86P through 92P. In this embodiment, the number of port connections corresponds to the number of different basic OSs 80, i.e., four OSs 86–92.

If a basic OS is partitioned into a subfamily of OSs, each partitioned OS may be provided with its own port (not indicated in drawing). On the other hand, fewer ports can be employed through use of port sharing (not indicated) by the basic and/or partitioned OSs.

The interface connections 86C–92C for the OSs 86–92 may be direct to the ATM switch 51 or indirectly to the ATM switch 51 through one or more other fast-packet switches (not specifically shown) and/or through other interface circuitry (not shown) such as multiplexer circuitry which may be used for port sharing.

Other service-related provisioning OSs may be directly coupled to the BIN SCPs 61 and 61B. In additional embodiments of the invention shown in FIGS. 2A and 2B, a BIN Integrated Service Control Point (BIN-ISCP) 285 or 285B is interfaced directly with the ATM switch 51 in a broadband advanced intelligent network 280 and provides network control with improved operations support similar to that described for the BIN-SCP 61 or 61B. Like reference characters are employed in FIGS. 2A and 2B for elements like those in FIG. 1A and 1B.

Figure 2A:
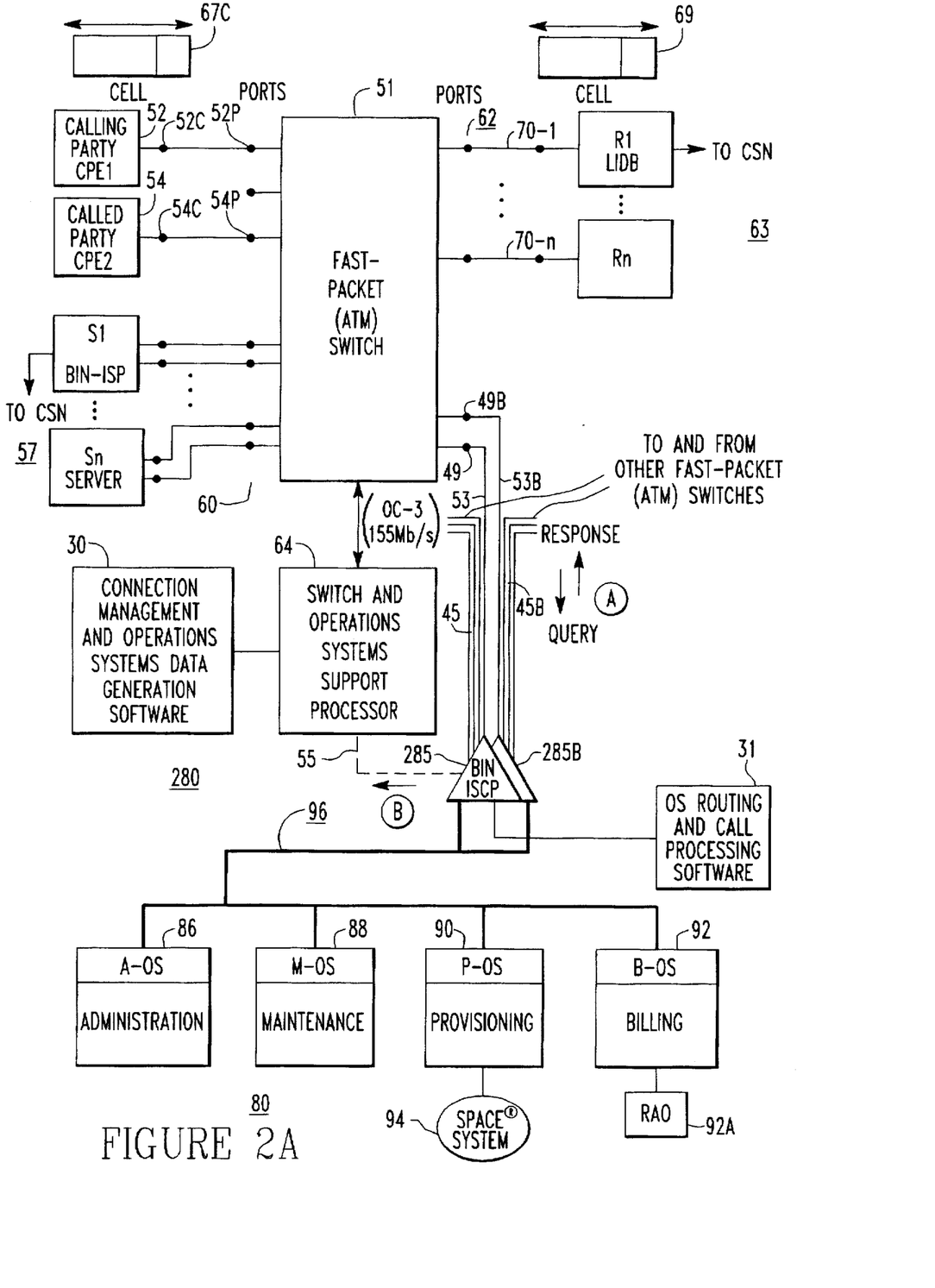
FIGS. 2A and 2B show respective network diagrams for third and fourth embodiments in which operations systems are integrated in a broadband advanced intelligent network in accordance with the invention to provide improved network operations.

The BIN 280 of FIG. 2A differs in operations systems support from the BIN 50 of FIG. 1A, principally through the provision of an OS 94 that provides a service creation function for the network. The OS 94 is a subfamily member of the P OSs 90 as shown.

In the OS 94, a SPACE® system and appropriate network controller structuring (i.e., ISCP) are employed to provide rapid creation of new network services requested by customers. Additional disclosure on the structure and operation of the SPACE® system is set forth in the incorporated U.S. Pat. Nos. 5,539,884 and 5,392,402, and U.S. patent application Ser. No. 08/125,978.

Figure 2B:
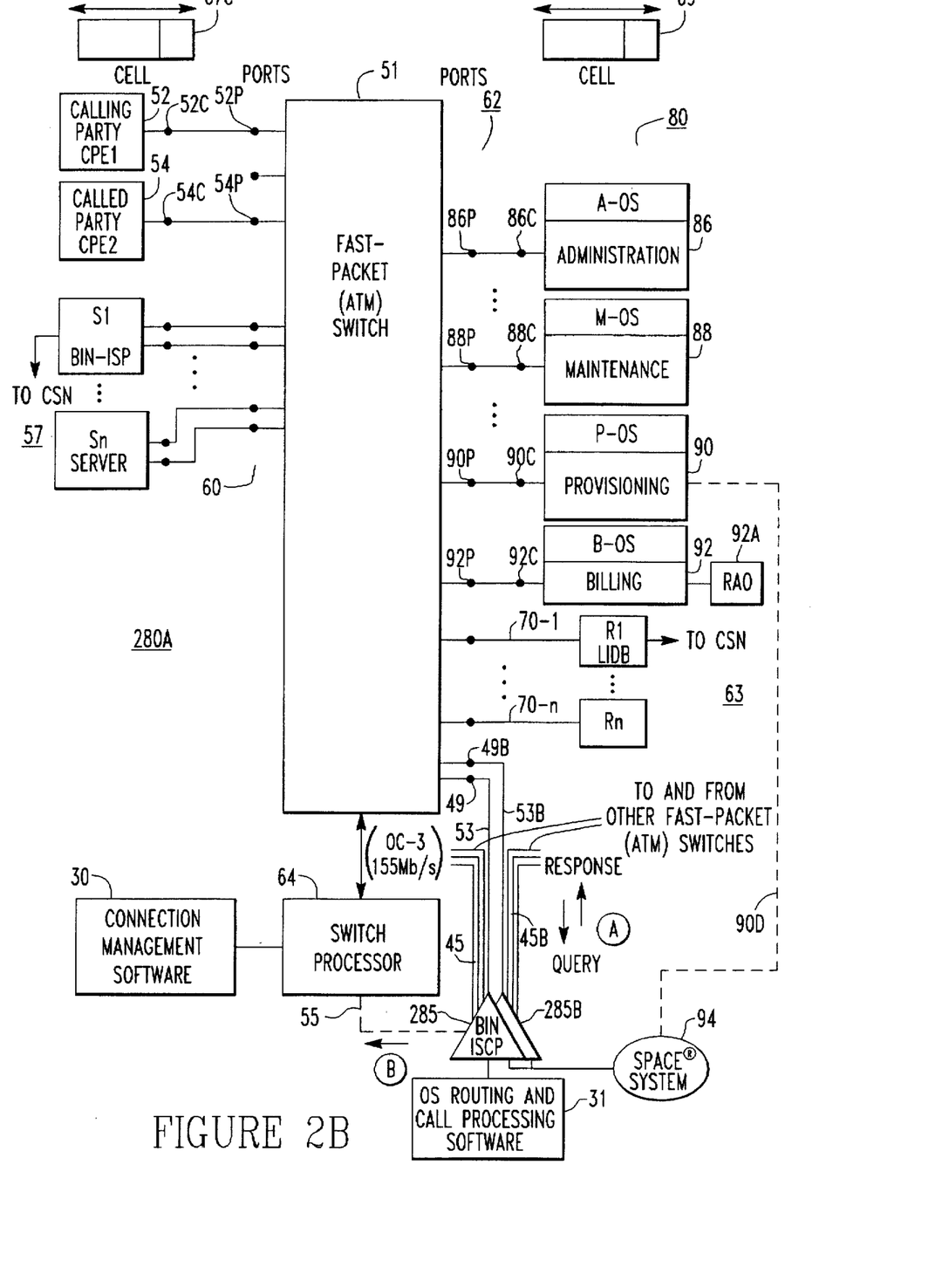

In FIG. 2B, a BIN 280A is shown as an additional embodiment of the invention. The BIN 280A is like the BIN 280 of FIG. 2A, but the BIN 280A has basic OSs 80 interfaced to ports of the fast-packet switch 51 as in the case of the BIN 50A of FIG. 1A. Service OSs, including the SPACE® system, may be directly coupled to the ISCP 285 or 285B.

In the embodiments of FIGS. 1A, 1B, 2A and 2B, command cells are generated by the network controller (BIN-SCP 61 or 61B or BIN-ISCP 285 or 285B) and transmitted through the umbilical connection 53 and the switch port 49 or 49B, thereby populating a translation or lookup table in the switch processor 64. Switched virtual connections are thus established and terminated for voice, data, image, and video communication cells, as described more fully hereinafter in connection with FIG. 3.

Command data may alternatively be transmitted to the processor 64 through a data link 55. In addition, the network controller may send signaling, command, and query cells to CPE units and resource and server units for communication and control purposes.

FAST-PACKET SWITCH

The switch 51 is a fast-packet (FP) switch which can be embodied in various forms, with some variation in the manner in which transmitted data is organized. For example, current state-of-the-art FP switches include the preferred ATM switches (data organized in fixed-length packets called "cells"), SMDS switches, and frame relay switches. Accordingly, as used herein, the term "cell" means a basic data packaging unit regardless of whether the unit is called a "cell", a "packet", or other name in the particular technology used to apply the invention.

The preferred ATM switch is a connection-oriented switch, which may have up to 1000 or more ports, employ virtual connections, and operate with fixed length data packets (cells). ATM switches can handle signals with transport rates of 155 Mb/s or greater and they introduce only sub-millisecond delays in transit time and in delay variability. The maximum expected delay through an ATM switch with 155 Mb/s ports is 150 microseconds.

The asynchronous transfer mode used in ATM switches is a CCITT standard for packaging, multiplexing, and switching end user digital information in fixed length data packets (cells), 53 bytes (octets) in length. The data cell, indicated at 67C and 69 in FIGS. 1A, 1B, 2A, and 2B, includes a header, to which 5 bytes are assigned, and a payload portion, to which 48 bytes are assigned.

The cell header normally contains both a Virtual Path Indicator (VPI) and a Virtual Channel Indicator (VCI). VPIs and VCIs are used to determine the routing of cells through permanent or switched virtual connections. These connections are termed virtual because they exist in the physical sense only for as long as a cell traverses the ATM switch.

The self-routing ATM switch uses the port identity and the VPI/VCI of incoming cells to establish the proper output port to which each cell should be routed based on lookup tables. The lookup (or translation) tables tie a cell with a particular label from a particular input port to a specified output port and give the cell a different label.

Signaling cells are preferably used to establish switched virtual connections through the ATM switch 51. As used herein, a "signaling cell", a response cell, a command cell, a data cell, or other ATM cell may be a single cell or a sequence of cells. Preferably, a signaling cell has the same format as the ATM cells described above. Signaling cells generated by a calling CPE request a particular service and contain the information in their payload necessary to provide the requested service, such as to complete a connection to another CPE, i.e., calling party address, called party address, billing information, digital bandwidth required, personal identification number (PIN), Calling Card number, etc. Signaling cells can be identified by unique values of the VPI and VCI or by a unique payload type code. If desired, the recently developed Q.93B signaling protocol may be used with the BIN 50, 50A, 280, or 280A.

CONNECTION OF NETWORK CONTROLLER (S) AND FAST-PACKET SWITCHES

In the BIN of each embodiment, the BIN-SCP 61 or BIN-ISCP 285 is connected to a port 49 of the ATM switch 51 for network communications, preferably through the umbilical connection 53 which may be a direct fiber optic link. The umbilical data link 55 can be employed as an alternate communication link to the switch processor 64. If the ATM switch 51 is handling OC-3 at 155 Mb/s, as shown, the interface with the BIN-SCP or BIN-ISCP is preferably at the same 155 Mb/s rate.

Preferably, a backup BIN-SCP 61B or BIN-ISCP 285B is connected to ATM switch port 49B through direct connection 53B to provide network-controlled services with extremely high reliability. If the BIN SCP 61 or BIN-ISCP 285 fails, the BIN SCP 61B or BIN-ISCP 285B immediately takes control of network services.

The BIN-SCP 61 or 61B or the BIN-ISCP 285 or 285B can share ports 49 and 49B, respectively, with other devices. As such, multiplexing equipment, etc., may be present in the connection between the BIN-SCP or BIN-ISCP and the switch port. The BIN-SCP 61 or 61B or the BIN ISCP 285 or 285B may also be interfaced (not shown) with a CSN to provide network controlled services therein as more fully set forth in the aforementioned U.S. Pat. No. 5,539,884.

As indicated by respective reference characters 45 and 45B, the primary and backup BIN-SCPs or BIN-ISCPs are also preferably directly connected to ports of other ATM switches (not shown). In an alternate embodiment, routing to (or from) other ATM switches can be through the ATM switch port 49 or 49B and through a permanent virtual connection in the ATM switch 51 to the destination ATM switch (not shown). Permanent virtual circuits would also be established in the destination and any intermediate ATM switches.

CALL CONNECTIONS

Figure 3:
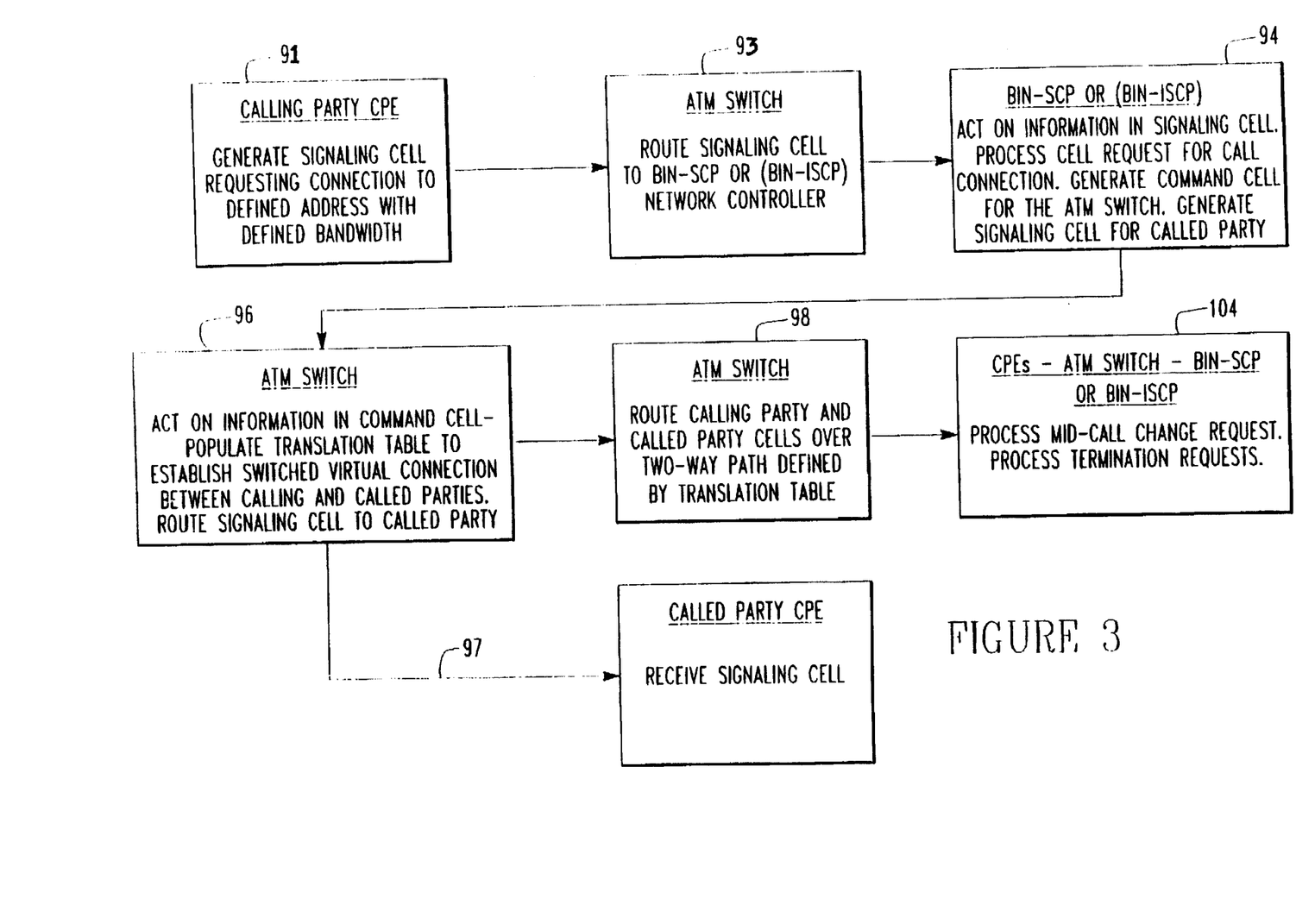
FIG. 3 is a system functional diagram which illustrates the operation of the network of FIG. 1A, 1B, 2A, or 2B.

The operation of the BIN of each embodiment of the invention in FIGS. 1A-2B, in establishing a call connection, is illustrated by the functional block diagram in FIG. 3. As indicated in block 91, the calling party CPE 52 (FIG. 1) generates a signaling cell to request a connection to a called party 54 or a network device, e.g., a resource unit, at a defined address (directory number) with a defined bandwidth corresponding, for example, to voice, data, image, or video.

As shown for block 93, the ATM switch 51 routes the signaling cell through a permanent virtual circuit to the BIN-SCP or BIN-ISCP which, in block 94, responds to the cell information and processes the request for a call connection and thereafter generates a command cell for the ATM switch 51 to establish the connection. In addition, a signaling cell is generated for the called party.

The ATM command cell and the called party signaling cell are sent directly to the ATM switch 51 through port 49 (FIG. 1A) as indicated by block 96. In response to the ATM command cell, the connection management processor of the ATM switch 51 acts on information in the command cell and populates its translation table in accordance with the received command, thereby establishing a two-way switched virtual connection between ATM ports 52P and 54P of the calling and called parties. In addition, the signaling cell generated by the BIN-SCP or BIN-ISCP is immediately routed through the ATM port 54P to the called party as indicated by reference character 97 (FIG. 3).

As indicated in block 98, once the called party answers the call, the ATM switch 51 routes calling and called party cells 67C and 69 (FIG. 1) through a two-way, switched virtual path. The translation table defines the two-way path so that each party receives the voice, data, image, and/or video cells transmitted by the other party.

As represented by block 104, system elements of the BIN can be operated during the call to process mid-call bandwidth changes or other requests or to process a call termination request. Thus, the CPE units 52 and 54, the resource unit 63, the server unit 57, the ATM switch 51, and the BIN-SCP 61 are operated to establish call changes or a call termination in a manner similar to that described for the original connection service. BIN operations to establish call connections, make mid-call changes, and terminate calls are more fully explained in the incorporated U.S. Pat. No. 5,539,884.

ILLUSTRATIVE OPERATIONS SYSTEMS

In accordance with the invention, the basic OSs 84-90 include operations systems structured and operated as follows.

A. Administration

An illustrative Administration OS 86 (FIG. 4A) collects and processes traffic data needed for switch congestion control, i.e., overload management, and for network engineering and planning purposes in the embodiment of FIG. 1A.

Generally, various kinds of traffic data are gathered by the ATM switch 51 under the control of software 86-1. For example, in the system of FIG. 4A, peg counters (86-2) may be used to count cells per second at switch ports, and the cells/second and any other traffic data are then reported by traffic reporting cells through the umbilical connection 53 to the network controller or BIN ISCP 285 under control of the switch processor 64. Alternatively, traffic data may be communicated directly from the switch processor 64 to the network controller 285 through the OS umbilical data links 55. In turn, the network controller 285 routes traffic data obtained from the traffic data cells to the OS 86 for collection and analysis.

Figure 4A:
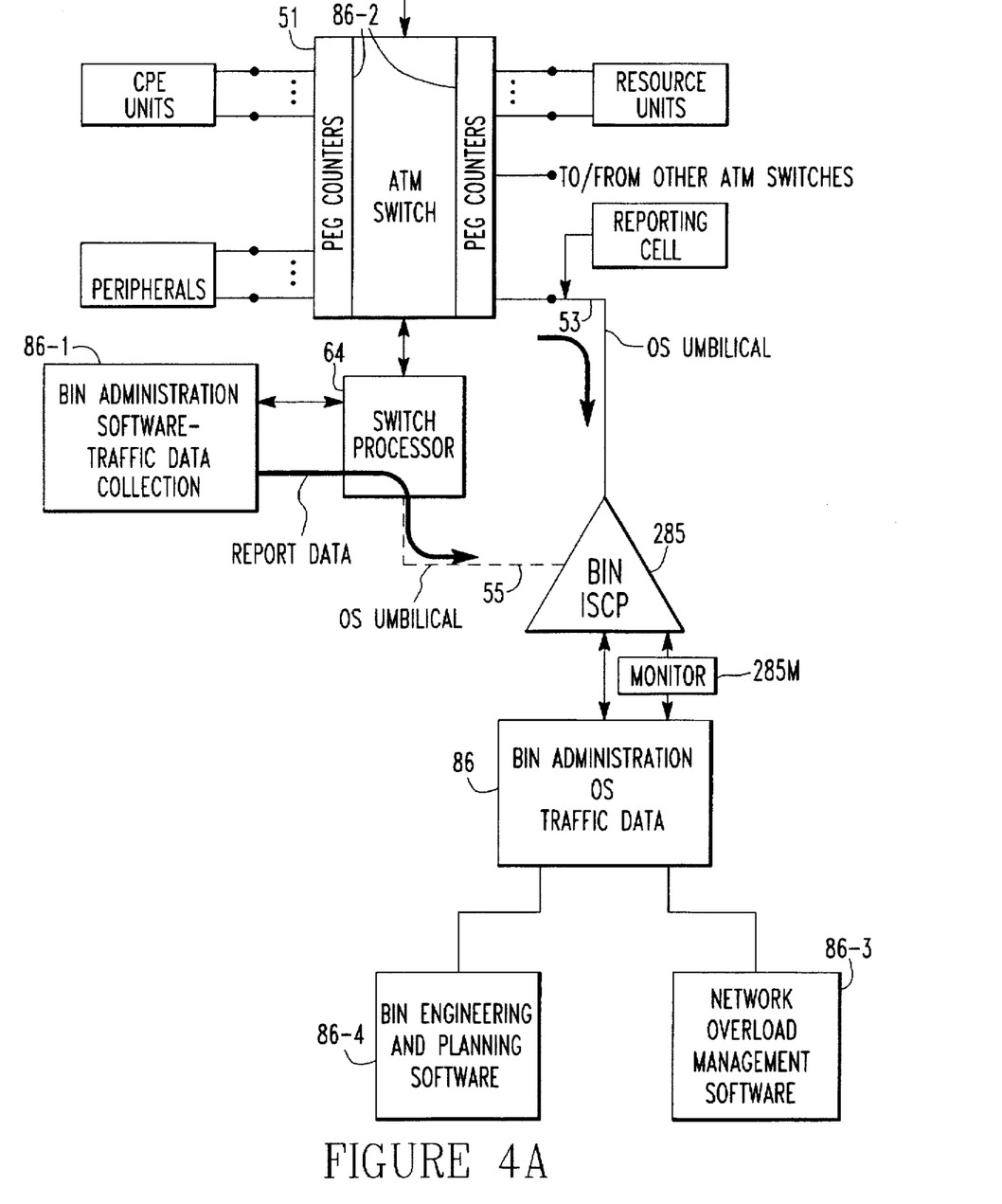
FIGS. 4A and 4B illustrate in greater detail an Administration Operations System employed in the networks of FIGS. 1A-2B.

If the switch 51 becomes overloaded, as indicated by switch data sent to the OS 86 through the use of communication cells, the overload is quickly detected by network overload management software 86-3 so that quick responsive actions can be taken to reduce the load. In this way, quality telecommunications service can be maintained for customers already using the network.

Thus, the OS 86 determines the offered load on the switch 51 from moment to moment, and, if an overload occurs, further determines network control actions which will avoid switch overload and provides switch and network congestion control. Switch overload may be avoided by control actions taken with respect to the switch 51 alone or together with other network switches and/or elements.

Although the BIN ISCP generally acts as a data handler for OS related data, exceptions may exist. For example, under certain overload conditions, such as heavy system use caused by an event, the BIN ISCP may be structured to respond immediately to an overload alarm and invoke congestion control, such as throttling back cells by periodically blocking new cells.

The Administration OS 86 further employs software 86-4 which analyzes traffic data for network engineering and planning purposes. This analysis preferably includes a long-term evaluation of traffic data as a function of time to determine loading trends which management can use in making engineering and network planning decisions.

Generally, the OS 86 determines the work effort of the ATM switch 51 as a function of time, and resulting data indicates when switch growth is needed to handle increasing levels of traffic. A computer system (not specifically indicated) is preferably included in the Administration OS 86 to perform required operation functions on input data received from the network.

Figure 4B:
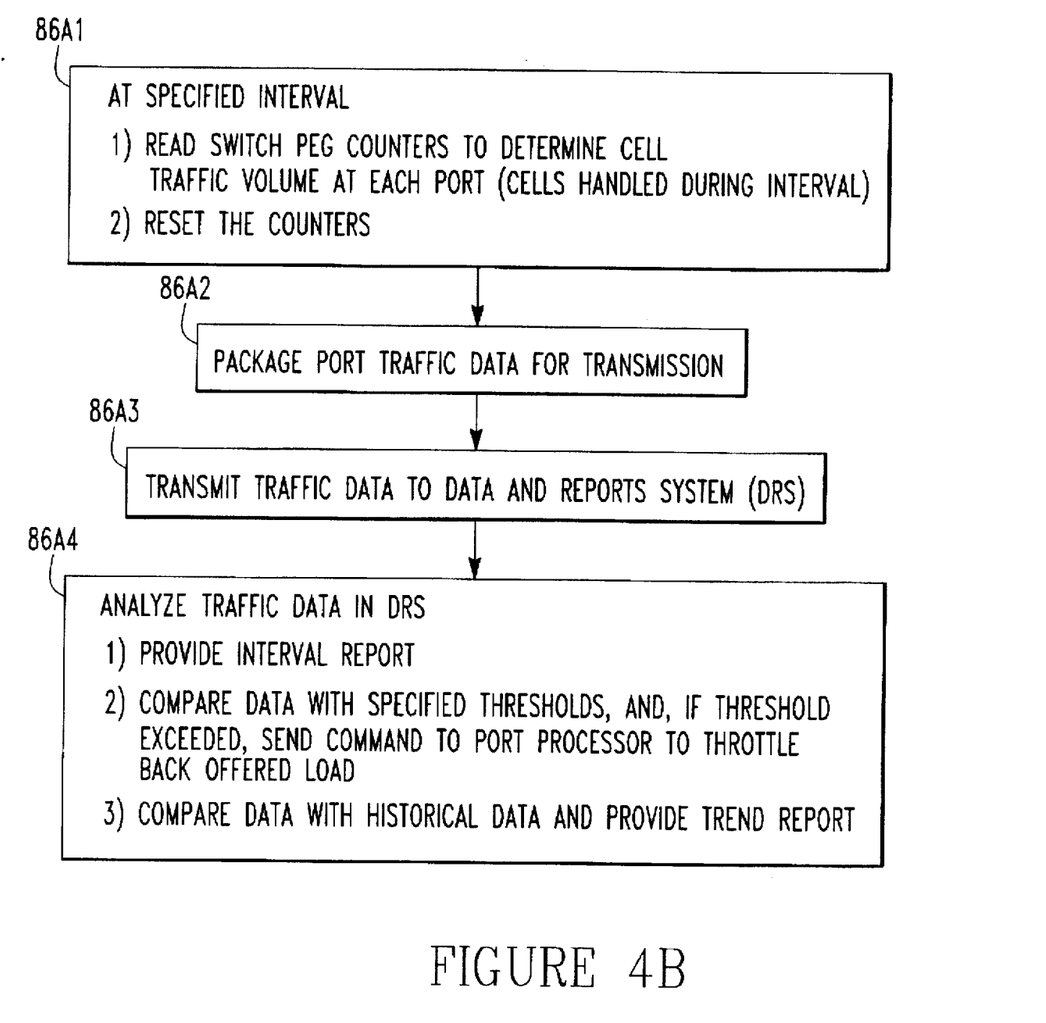

A functional processing diagram in FIG. 4B illustrates the manner in which various elements of the BIN operate in conjunction with the Administration OS 86 to provide traffic data analysis and control and to produce traffic data reports. Generally, where functions are performed by computers within the BIN, programmed procedures are executed by such computers to provide such functions.

As indicated by step 86A1, peg counters in the fast-packet switch 51 are read by the switch processor 64 at specified intervals to determine the volume of cell traffic at each peg (i.e., the number of cells handled during the specified interval of time). At the end of each time interval, the port counters are reset by the switch processor 64.

As indicated in step 86A2, the port traffic data is packaged in cells for transmission to the OS 86. The switch processor 64 then transmits, step 86A3, the traffic data cells through the ATM switch 51 to a data and reports system (DRS) in the OS 86. Alternatively, as already indicated, the data link 55 may be used for transmitting packaged traffic data through the network controller to the OS 86.

In the DRS, step 86A4, interval reports are developed in which actual traffic data are compared with specified thresholds, and when a threshold is exceeded, a command is sent to the switch processor to manage the port traffic so that the offered load is throttled back to the threshold level. In addition, the OS86 compares actual traffic data with stored historical traffic data for generation of a trend report which may be used by management for future network planning.

B. Maintenance

Figure 5A:
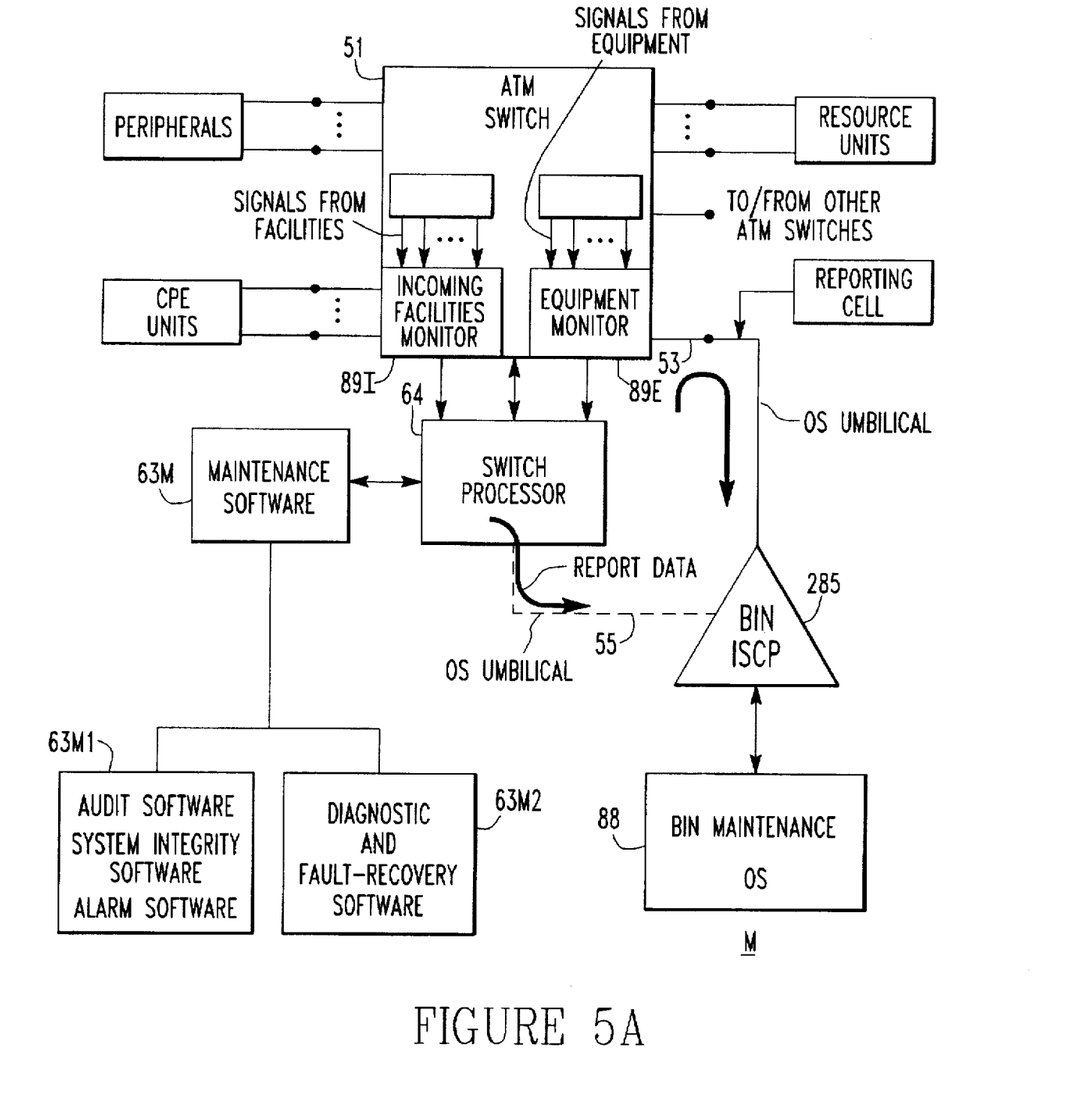
FIGS. 5A and 5B illustrate in greater detail a Maintenance Operations System employed in the networks of FIGS. 1A-2B.

An illustrative Maintenance OS 88 is a surveillance system, as shown, for example, in FIG. 5A, which processes alarm data received from various monitored network elements (such as fiber optic transmission systems, ATM switch elements, network controller, etc.). Generally, each monitored network element or system is provided with a self-alarm capability and some level of self recovery, and in many cases, with a redundant backup element or system.

A minor alarm is issued when a problem has occurred without affecting service. A major alarm is issued when a failure has occurred and service has been or will be affected.

The ATM switch 51 accordingly employs an incoming transmission facilities monitor 89I and an equipment monitor 89E which generate minor or major alarm data when a failure condition is detected. The incoming facilities monitor 89I can, for example, be a small processor which checks ATM cell headers for CRC errors and generates an alarm signal which is coupled to the switch processor to indicate an incoming facility failure such as a defective optical fiber connection. The switch processor 64 controls transmission of the failure alarm data using monitor reporting communication cells from the ATM switch 51 through the umbilical connection 53 to the network controller 285 which sends the data to the M-OS 88 for recording, processing, and analysis. A network controller monitor generates an alarm signal for the OS 86 when the network controller 285 fails and is automatically replaced by the backup controller 285B (FIG. 2A or 2B).

Problems or faults, which are detected by the switch processor 64, are first analyzed and diagnosed before transmission to the OS 88. After analysis of the condition by maintenance software 63M which includes audit, system integrity and alarm software 63 M1 as well as diagnostic and fault recovery software 63M2, a report cell is generated by the switch processor 64 and transmitted through the umbilical connection 53 and the BIN ISCP to the OS 88. Monitoring can also include cyclic generation of a "keep alive" signal between the switch processor 64 and the BIN ISCP which indicates an alarm condition only if this signal is interrupted or stopped.

Figure 5B:
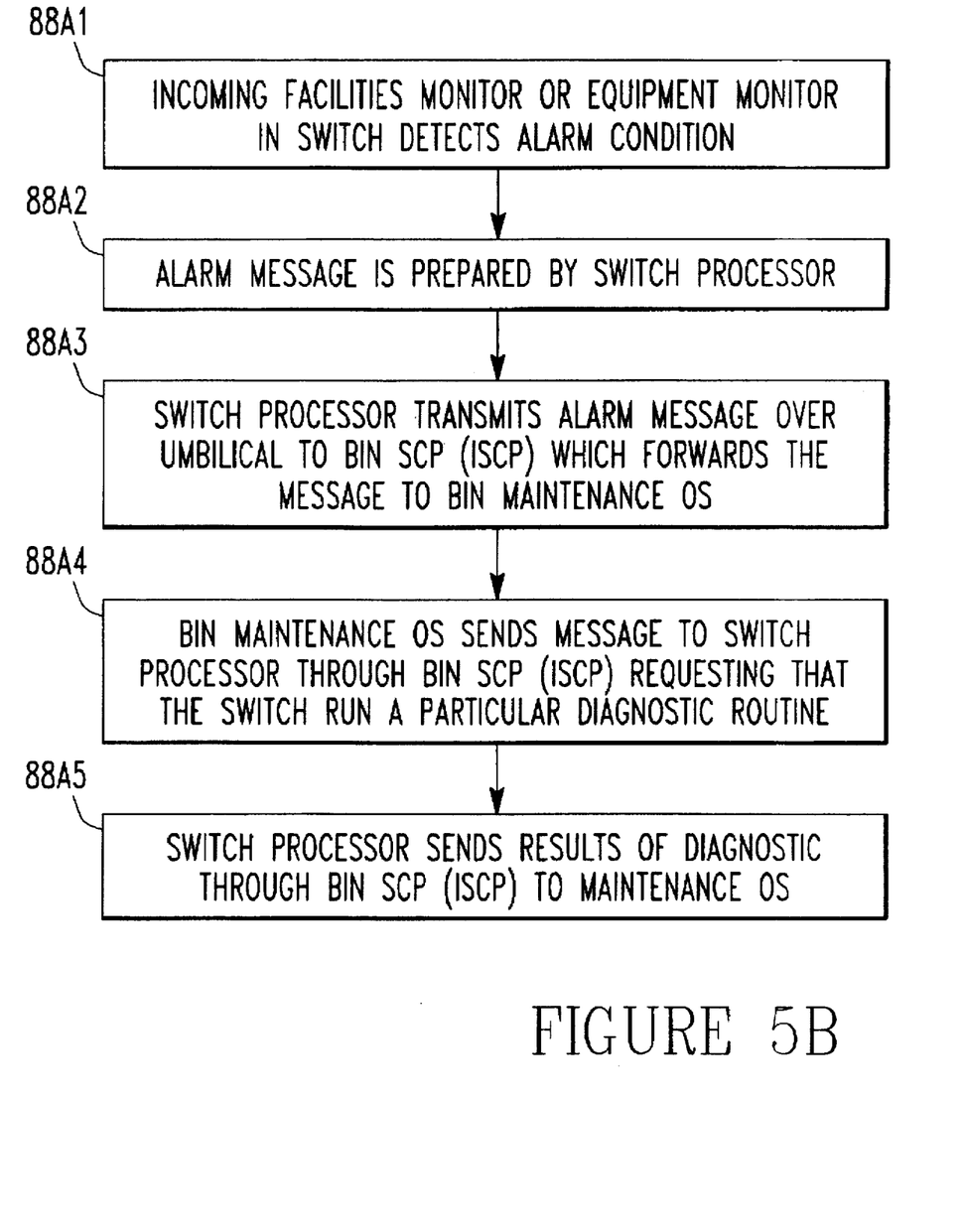

A functional processing diagram in FIG. 5B illustrates the manner in which various elements of the BIN operate with the Maintenance OS 88 to provide alarm data monitoring and congestion control. As indicated by step 88A1, the incoming facilities monitor 89I or the equipment monitor 89E detects an alarm condition. Each monitor 89I or 89E might include a microprocessor (not shown) which is programmed to detect and transmit specific alarm conditions from input signals received from facilities or equipment.

In step 88A2, the switch processor 64 receives alarm signals from the monitors and, in turn, generates a message for each alarm. As indicated by step 88A3, the switch processor 64 packages alarm messages in data reporting cells which are transmitted through the umbilical 53 to the network controller 285. In turn, the network controller 285 forwards the alarm messages to the maintenance OS 88.

As indicated by block 88A4, the Maintenance OS 88 responds to the alarm message with the execution of a programmed procedure to determine which, if any, diagnostic routine should be run on the alarmed facility or equipment. A request is then made through the network controller and the umbilical connection 53 for the switch processor 64 to run the determined diagnostic routine. Alternatively, the request may be directly data linked through the umbilical 55 to the switch processor 64.

In step 88A5, the switch processor 64 operates under the control of the software 63M2 and runs the requested diagnostic routine relative to the alarmed facility or equipment. In this process, additional data may be obtained from the alarmed facility or equipment. Once the diagnostic routine has been completed, the switch processor 64 packages the results of the diagnostic in data reporting cells which are transmitted through the umbilical 53 to the network controller 285. The network controller 285 forwards the results to the Maintenance OS 88.

C. Provisioning

Provisioning systems are used to put in place whatever physical resources are needed in the network to provide a customer with a particular service. In applying the present invention, the network has basic resources required to provide services needed by a customer equipped to interface with the network. Thus, a Provisioning OS 90 assigns the network resources needed by the customer and populates network data bases with information about that customer, the customer's station equipment, and the customer's services.

Figure 6A:
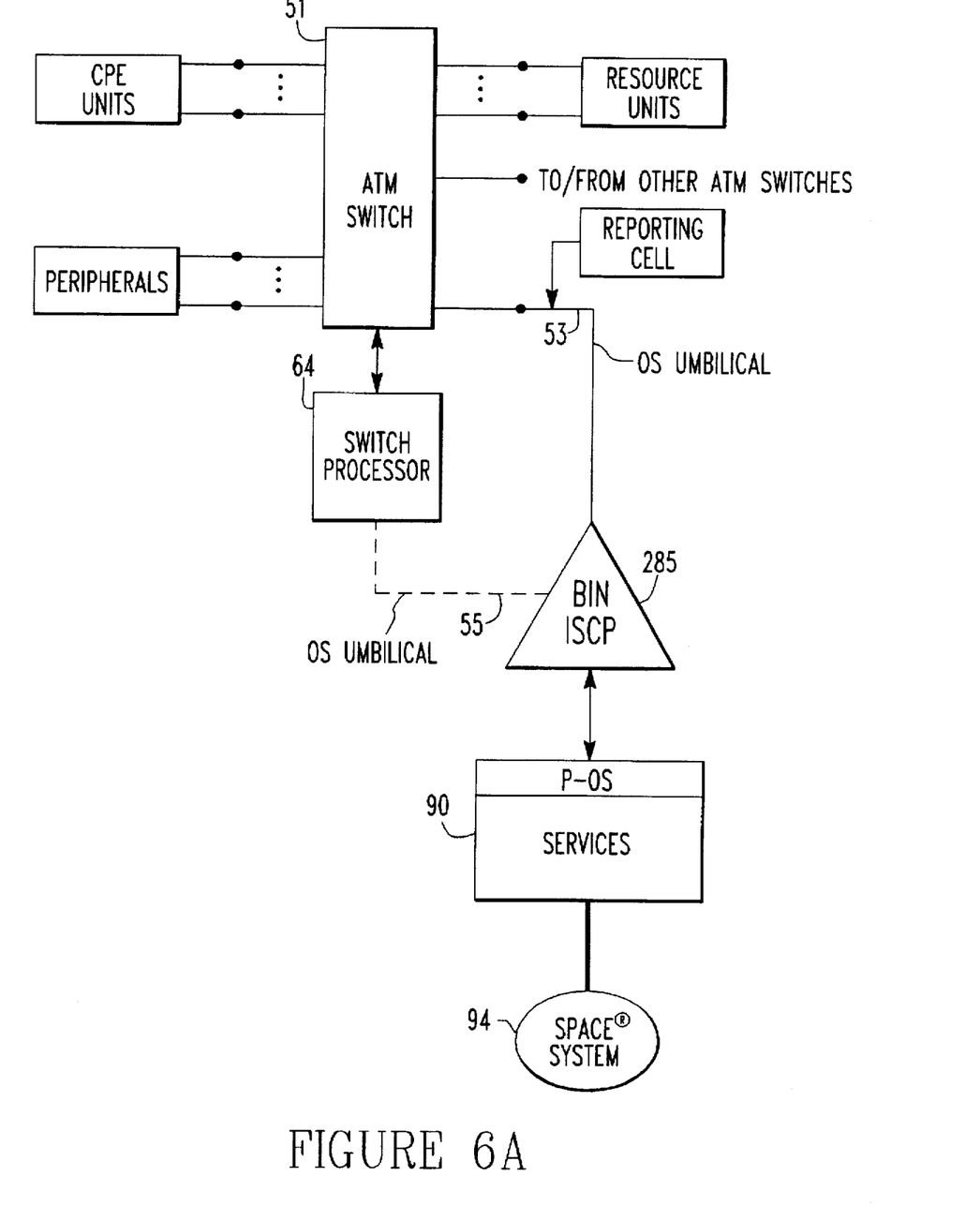
FIGS. 6A and 6B show in greater detail a Provisioning Operations System employed in the networks of FIGS. 1A-2B.

As shown in FIGS. 2A, 2B and 6A, the P-OS 90 includes a SPACE® system 94 that creates customer services as described in the incorporated group of patent applications related to the SPACE® system, and as further described in the other incorporated patent applications.

In FIG. 2B, the SPACE® system is directly linked to the network controller 285. Dotted line 90D indicates that the SPACE® system is a part of the P-OS 90. Other parts of the P-OS 90 are linked to the network through the ATM switch 51.

Figure 6B:
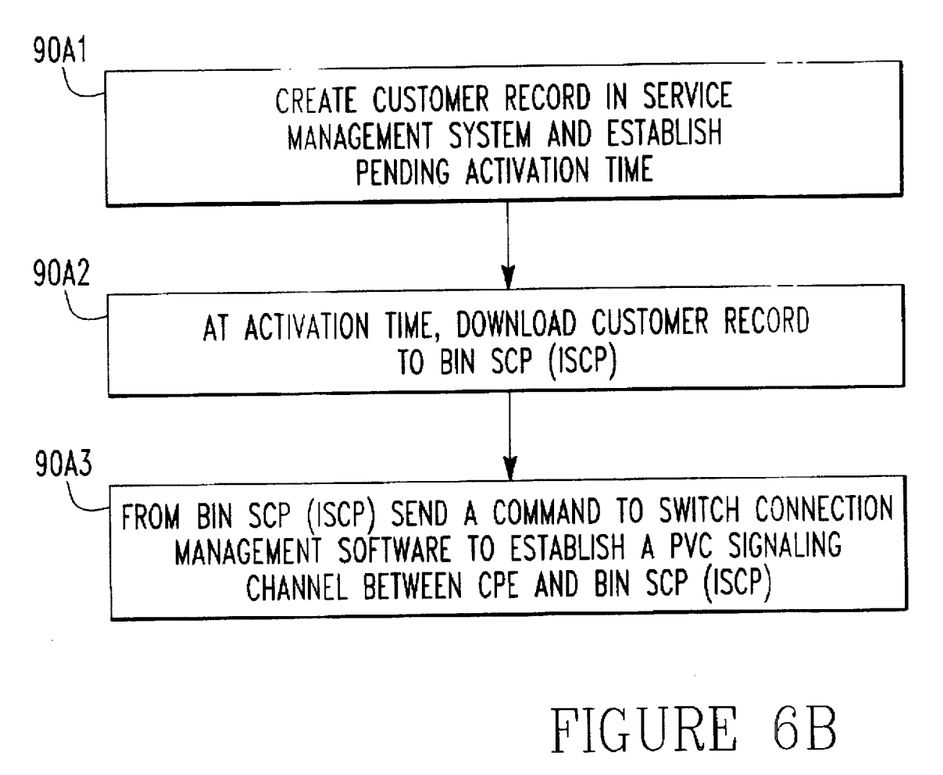

Generally, as shown in functional processing diagram FIG. 6B, service provisioning begins at step 90A1 by creating a customer record in a service management system in the Provisioning OS 90. The customer record defines the customer service and includes a pending activation time for the service.

When the activation time arrives, the customer record is downloaded to the network controller 61 or 285 as shown by step 90A2. In turn, step 90A3, the network controller sends a command cell to the ATM switch 51 where the command is acted upon by the connection management software in the switch processor. A permanent virtual channel is thus established between the customer's CPE and the network controller so that the service can be invoked.

D. Billing

A billing OS 92 is used to process customer billing data received from the network controller for use of network resources and other services. The billing data for connection service (for voice, data, image/video transmission) is based, for example, on identification of the numbers of the calling and called parties, the bandwidth used, and the time the call or session is placed, answered and terminated. The network controller preferably collects and assembles the billing data and sends it to the billing OS 92 at the completion of each call or session, or it can send data as it is collected. If the latter method is used, the billing OS-92 includes a capability to correlate the incoming billing records.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A broadband intelligent network comprising:
   a fast-packet switch having a plurality of ports;
   a switch processor for establishing switched or virtual port connections, for routing cells through the connections to and from the ports, and for processing network operations signals;
   a network control system coupled to the switch processor to receive network operations signals therefrom and to send network operations signals thereto;
   a network operations system interfaced with the network control system, said network control system including means for routing network operations signals between the switch processor and the network operations system, and
   a system for collecting switch port cell traffic data; and wherein,
   the network operations system is an administrative operations system;
   the switch processor includes means for receiving, processing, and packaging the port cell traffic data for transmission to the administrative operations system through the network control system; and
   the administration operations system includes means for processing the received port cell traffic data.

2. The network of claim 1 wherein the processing means compares the port traffic data to thresholds and sends a command signal through the network control system to the switch processor to signal upstream in the network to reduce the offered load if a threshold is exceeded.

3. The network of claim 1 wherein the processing means compares the switch port traffic data to stored historical data for generation as an output report.

4. A broadband intelligent network comprising:
   a fast-packet switch having a plurality of ports;
   a switch processor for establishing switched or virtual port connections, for routing cells through the connections to and from the ports, and for processing network operations signals;
   a network control system coupled to the switch processor to receive network operations signals therefrom and to send network operations signals thereto;
   a network operations system interfaced with the network control system, said network control system including means for routing network operations signals between the switch processor and the network operations system, and monitor systems for detecting network alarm conditions and generating alarm signals, wherein, the network operations system is a maintenance operations system;

the switch processor receives at least some of the alarm signals, processes the alarm signals for transmission, and transmits the alarm signals to the network control system; and the network control system sends alarms corresponding to the alarm signals to the maintenance operations system for processing.

5. The network of claim 4 wherein the monitor systems include a switch incoming facilities monitor and a switch equipment monitor.

6. The network of claim 4 wherein:

the maintenance operations system includes means for processing each alarm signal to determine whether a diagnostic routine is to be run and means for generating an output command signal for implementation of each such diagnostic routine.

7. The network of claim 6 wherein the monitor systems include a switch incoming facilities monitor and a switch equipment monitor, and the output command signal from the maintenance operations system is routed through the network control system to the switch processor which operates at least one of the switch incoming facilities monitor and the switch equipment monitor to execute a diagnostic routine, and determine the source of the fault condition represented by the alarm signal.

8. The network of claim 7 wherein the diagnosed fault condition is transmitted from the switch processor through the network control system to the maintenance operations system.

9. A broadband intelligent network comprising a fast-packet switch having a plurality of ports;

a switch processor for establishing switched or virtual port connections, for routing cells through the connections to and from the ports, and for processing network operations signals;

a network control system coupled to the switch processor to receive network operations signals therefrom and to send network operations signals thereto;

a network operations system interfaced with the network control system, said network control system including means for routing network operations signals between the switch processor and the network operations system, and wherein:

respective customer data links having a wide digital bandwidth are connected to respective switch ports for transmitting cells to and from customer premises equipment respectively connected to the customer data links;

the network operations system is a network provisioning system having a service creation system;

the service creation system includes a service management system for creating customer records which define customer services to be provided by the network over the customer data links and which further define pending service activation times;

each customer record is downloaded to the network control system at the corresponding activation time; and the network control system sends a command signal to the switch processor which has switch connection management means for establishing a permanent virtual channel between the CPE being served and the network control system.

10. A method for operating a broadband intelligent network comprising the steps of:

establishing switched or permanent virtual port connections in a fast-packet switch;

routing cells through the connections to and from the ports;

receiving at a network control system coupled to the switch processor network operations signals;

sending operating signals to the network control system coupled to the switch processor;

receiving, processing, and/or transmitting operations data to/from a network operations system which is interfaced with the network control system and which is an administration operations system;

sending network operations data signals between the switch processor and the network operations system;

collecting switch port cell traffic data;

receiving, processing, and packaging the switch port cell data traffic in the switch processor for transmission to the administration operations system through the network control system; and processing the received switch port cell traffic data in the administration system.

11. The method of claim 10 wherein the processing step includes the substeps of comparing the switch port traffic data to thresholds and sending a command signal through the network control system to the switch processor to reduce the offered load if a threshold is exceeded.

12. A method for operating a broadband intelligent network comprising the steps of:

establishing switched or permanent virtual port connections in a fast-packet switch;

routing cells through the connections to and from the ports;

receiving at a network control system coupled to the switch processor network operations signals;

sending network operations signals to the network control system coupled to the switch processor;

receiving, processing, and/or transmitting operations data to/from a network operations system which is interfaced with the network control system and which is a maintenance operations system;

sending network operations data signals between the switch processor and the network operations system;

detecting network alarm conditions;

generating alarm signals in response to network alarm conditions;

receiving at least some of the alarm signals and processing the received alarm signals for transmission in the switch processor;

transmitting the processed alarm signals to the network control system; and sending alarms corresponding to the processed alarm signals to the maintenance operations system.

13. The method of claim 12 wherein the monitor systems include a switch incoming facilities monitor and a switch equipment monitor.

14. The method of claim 12 wherein said processing step includes the step of determining whether a diagnostic routine is to be run for the alarms and generating an output command signal for implementation of each such diagnostic routine.

15. The method of claim 14 wherein the monitor systems include a switch incoming facilities monitor and a switch equipment monitor, and the method further includes the step of:

routing the output command signal through the network control system to the switch processor which operates at least one of the of the switch incoming facilities monitor and the switch equipment monitor to execute a diagnostic routine and determine the source of the fault condition represented by the alarm signal.

16. The method of claim 15 wherein the diagnosed fault condition is transmitted from the switch processor through the network control system to the maintenance operations network.

17. A method for operating a broadband intelligent network comprising the steps of:

establishing switched or permanent virtual port connections in a fast-packet switch;

routing cells through connections to and from the ports;

receiving at a network control system coupled to the switch processor network operations signals;

sending network operations signals to the network control system coupled to the switch processor;

receiving, processing, and/or transmitting data to/from a network operations system which is interfaced with the network control system and which is a network provisioning system having a service creation system; and sending network operations data signals between the switch processor and the network operations system;

wherein cells are transmitted to and from customer premises equipment units respectively connected to customer data links which are connected to respective switch ports and which have a wide digital data bandwidth; and the method further comprising the steps of:

creating customer records in a service management system with the service creation system to define customer services to be provided by the network over the customer data links and to define pending service activation times;

downloading each customer record to the network control system at the corresponding activation time;

sending a command signal to the switch processor; and establishing a permanent virtual channel between the customer premises equipment units being served and the network control system.

18. A method for operating a broadband intelligent network comprising the steps of:

establishing switched or permanent virtual port connections in a fast-packet switch;

routing cells through the connections to and from the ports;

receiving at a network control system coupled to the switch processor network operations signals;

sending network operations signals to the network control system coupled to the switch processor;

receiving, processing, and/or transmitting operations data to/from a network operations system which is interfaced with the network control system; and sending network operations data signals between the switch processor and the network operations system; and wherein the network operations system is coupled to the fast-packet switch through an interface to at least one operations switch port, and the routing step employs cells sent through the fast-packet switch and the one operations switch port to provide interfacing between the network control system and the operations system.

19. A broadband intelligent network comprising:

a fast-packet switch having a plurality of ports;

a switch processor for establishing switched or virtual port connections, for routing cells through the connections to and from ports, and for processing network operations signals;

a network control system coupled to the switch processor to receive network operations signals therefrom and to send network operations signals thereto; and a network operations system interfaced with the network control system;

wherein the network control system includes means for routing network operations signals between the switch processor and the network operations system;

wherein the network control system is coupled to the switch processor through an interface to at least one switch port through which network operations cells are set and received; and wherein the network operations system is coupled to the fast-packet switch through an interface to at least one operations switch port, and the routing means employs cells sent through the fast-packet switch and the one operations switch port to provide interfacing between the network control system and the operations system.

* * * * *